(12) United States Patent
Abe et al.

(10) Patent No.: US 12,292,118 B2
(45) Date of Patent: May 6, 2025

(54) PISTON RING

(71) Applicant: TPR Co., Ltd., Tokyo (JP)

(72) Inventors: Yushi Abe, Tokyo (JP); Naoki Umeda, Tokyo (JP); Masayuki Ohira, Tokyo (JP); Akira Hikone, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 18/839,495

(22) PCT Filed: Nov. 16, 2022

(86) PCT No.: PCT/JP2022/042600
§ 371 (c)(1),
(2) Date: Aug. 19, 2024

(87) PCT Pub. No.: WO2023/162370
PCT Pub. Date: Aug. 31, 2023

(65) Prior Publication Data
US 2025/0116331 A1    Apr. 10, 2025

(30) Foreign Application Priority Data
Feb. 28, 2022  (JP) ................................ 2022-030032

(51) Int. Cl.
*F16J 9/20* (2006.01)
(52) U.S. Cl.
CPC ........................................ *F16J 9/20* (2013.01)
(58) Field of Classification Search
CPC ........................................................... F16J 9/20
See application file for complete search history.

(56) References Cited

U.S. PATENT DOCUMENTS 1,497,106 A   6/1924  Lanterman
1,567,452 A  12/1925  Arden
(Continued)

FOREIGN PATENT DOCUMENTS

DE       350537 C       3/1922
DE       467510 C      10/1928
(Continued)

OTHER PUBLICATIONS

Extended European Search Report in EP Application No. 22928887.3 dated Aug. 30, 2024, 8 pages.
(Continued)

*Primary Examiner* — Long T Tran
(74) *Attorney, Agent, or Firm* — Marshall, Gerstein & Borun LLP

(57) ABSTRACT

An outer circumferential surface of a piston ring has a cut surface forming a notched portion between an outer circumferential end surface and a lower surface, the cut surface including a first surface between the outer circumferential end surface and a bottom portion, and a second surface between the bottom portion and the lower surface. The second surface is inclined away from a central axis of the piston ring as it extends toward a crank chamber side, an angle of inclination of the second surface with respect to the bottom portion being greater than or equal to 50° and less than or equal to 85°. When an axial width of the piston ring is h1 and a distance in an axial direction between a connecting portion between the cut surface and the outer circumferential end surface and a connecting portion between the cut surface and the lower surface is H, H/h1 is greater than or equal to 0.2 and less than or equal to 0.4.

6 Claims, 12 Drawing Sheets

(56) References Cited

U.S. PATENT DOCUMENTS

| | | | |
|---|---|---|---|
| 2,372,979 A | | 4/1945 | Phillips |
| 2,511,874 A | | 6/1950 | Phillips |
| 2,940,803 A | * | 6/1960 | Phillips ............... F16J 9/20 277/444 |
| 5,253,877 A | * | 10/1993 | DeBiasse ............... F16J 9/206 277/440 |
| 6,206,379 B1 | * | 3/2001 | Toshiaki ............... F16J 9/206 277/491 |
| 2002/0033579 A1 | * | 3/2002 | Ishida ............... F16J 9/203 277/434 |
| 2004/0012153 A1 | | 1/2004 | Yoshida et al. |
| 2010/0162987 A1 | * | 7/2010 | Ishida ............... F16J 9/14 123/193.6 |
| 2013/0154196 A1 | * | 6/2013 | Sytsma ............... F16J 9/00 29/888.074 |
| 2013/0328274 A1 | * | 12/2013 | Sugiura ............... F16J 9/20 277/444 |
| 2015/0198249 A1 | * | 7/2015 | Watanabe ............... F16J 9/20 277/434 |
| 2017/0321803 A1 | * | 11/2017 | Meacham ............... F16J 9/203 |
| 2018/0017159 A1 | * | 1/2018 | Fujita ............... F16J 9/206 |
| 2019/0049010 A1 | * | 2/2019 | Fujita ............... F16J 9/26 |
| 2022/0003316 A1 | * | 1/2022 | Ikeya ............... F16J 9/206 |
| 2022/0145990 A1 | * | 5/2022 | Nakazawa ............... B23P 15/065 |

FOREIGN PATENT DOCUMENTS

| | | |
|---|---|---|
| JP | S49-123403 U | 10/1974 |
| JP | H06-265020 A | 9/1994 |
| JP | 2003-113940 A | 4/2003 |
| JP | 2020-193666 A | 12/2020 |
| WO | WO-2016/121483 A1 | 8/2016 |
| WO | WO-2020/095807 A1 | 5/2020 |

OTHER PUBLICATIONS

Office Action in JP Application No. 2022-030032 dated Jan. 24, 2023, 6 pages.
Search Report in International Application No. PCT/JP2022/042600 dated Jan. 31, 2023, 4 pages.
Decision to Grant a Patent in JP Application No. 2022-030032 dated Jun. 13, 2023, 5 pages.
Written Opinion in JP Application No. 2022-030032 dated Mar. 23, 2023, 6 pages.
Written Amendment in JP Application No. 2022-030032 dated Mar. 24, 2023, 4 pages.
Notice of Reasons for Refusal in JP Application No. 2022-030032 dated Jan. 24, 2023, 7 pages.

* cited by examiner

EXAMPLE 2

COMPARATIVE EXAMPLE 2

COMPARATIVE EXAMPLE 3

PISTON RING

TECHNICAL FIELD

The present invention relates to a piston ring.

BACKGROUND ART

An internal combustion engine mounted on a general automobile adopts a configuration in which three piston rings formed by combining two compression rings (pressure rings) including a top ring and a second ring and one oil ring are provided on a piston fitted in a cylinder. These three piston rings, i.e., the top ring, the second ring and the oil ring in order from an upper side (combustion chamber side), are mounted in ring grooves formed on the outer circumferential surface of the piston, and slide on the inner wall surface of the cylinder. The oil ring farthest from a combustion chamber has an oil sealing function of suppressing the outflow of oil to the combustion chamber side (oil rise) by scraping off excess engine oil (lubricating oil) adhered to the cylinder inner wall surface to a crank side, and a function of preventing seizure of the piston associated with operation of the internal combustion engine by adjusting an amount of oil so that a lubricating oil film is appropriately held on the cylinder inner wall surface. The compression rings have a gas seal function of suppressing the outflow (blow-by) of combustion gas from the combustion chamber side to the crank chamber side by maintaining airtightness, and an oil sealing function of suppressing the oil rise by scraping off excess oil that has not been completely scraped off by the oil ring. By such a combination of the piston rings, reduction of blow-by gas and oil consumption in the internal combustion engine is achieved. In addition, it is known that oil scraping performance is improved by forming the second ring as a scraper ring in which a stepped notch (undercut) is formed in a lower portion on the outer circumferential side (for example, Patent Literature 1).

CITATION LIST

Patent Literature

Patent Literature 1: JP 2003-113940 A
Patent Literature 2: JP 2020-193666 A
Patent Literature 3: WO 2016/121483 A1

SUMMARY OF INVENTION

Technical Problem

However, in an internal combustion engine in which a conventional piston ring having an undercut is assembled, on a downward stroke of a piston, a part of oil on a cylinder inner wall may flow on a surface of the undercut to hit a chamfered portion of a ring groove formed in the piston, and may flow into a space between a lower surface of the piston ring and a lower wall surface of the ring groove. Such oil may flow out to a combustion chamber side, which could increase oil consumption.

The present invention has been made in view of the above-described problem, and an object of the present invention is to provide a technique capable of reducing oil consumption of an internal combustion engine in a piston ring having an undercut shape.

Solution to Problem

In order to solve the above-mentioned problem, the present invention adopts the following means. That is, the present invention provides a piston ring mounted on a piston of an internal combustion engine, the piston ring comprising: an outer circumferential surface provided on an outer circumference of the piston ring; an inner circumferential surface provided on an inner periphery of the piston ring; an upper surface facing a combustion chamber side in the internal combustion engine among axial end surfaces of the piston ring; and a lower surface positioned on a crankcase side in the internal combustion engine among the axial end surfaces of the piston ring;

wherein the outer circumferential surface includes: an outer circumferential end surface including an outer circumferential end that is the largest diameter in the piston ring in a cross section orthogonal to a circumferential direction of the piston ring; and a cut surface connecting the outer circumferential end surface and the lower surface so as to form a notch extending in the circumferential direction of the piston ring between the outer circumferential end surface and the lower surface;

the cut surface includes: a bottom portion of the cut surface that is positioned at an innermost side in a radial direction of the piston ring; a first surface provided between the outer circumferential end surface and the bottom portion and facing the crank chamber side; and a second surface provided between the bottom portion and the lower surface and facing outward in the radial direction;

the second surface is inclined away from a central axis of the piston ring as it extends toward the crank chamber side;

an angle of inclination of the second surface with respect to the lower surface in a cross section orthogonal to the circumferential direction of the piston ring is greater than or equal to 50° and less than or equal to 85°; and when an axial width of the piston ring is h1 and a distance in an axial direction between a connecting portion between the cut surface and the outer circumferential end surface and a connecting portion between the cut surface and the lower surface is H, H/h1 is greater than or equal to 0.2 and less than or equal to 0.4.

According to the piston ring of the present invention, a part of the oil scraped off by the piston ring flows along the slope of the second surface, so that the part of the oil can easily escape to the outer circumferential side of the piston ring and drop to the crank chamber side. Thus, the oil is prevented from flowing into the space between the lower surface of the piston ring and the lower wall surface of the ring groove.

In addition, in the present invention, when a distance in the radial direction of the piston ring between the connecting portion of the cut surface and the outer circumferential end surface and the connecting portion of the cut surface and the lower surface is D, the distance D may be set such that 0.2 mm≤D≤0.6 mm.

Also, in the present invention, the first surface may be inclined to be away from the crank chamber as it extends inward in the radial direction of the piston ring, and an angle of inclination of the first surface with respect to the lower surface in the cross section orthogonal to the circumferential direction of the piston ring may be less than or equal to 30°.

Moreover, in the present invention, the cut surface may include the bottom portion and a third surface connecting the first surface and the second surface, the third surface may be curved in a concave shape, and a radius of curvature of the third surface may be greater than or equal to 0.05 mm and less than or equal to 0.2 mm.

Further, in the present invention, the cut surface may further include a lower R surface connecting the second surface and the lower surface, and a radius of curvature of the lower R surface may be greater than or equal to 0.01 mm and less than or equal to 0.2 mm.

Furthermore, in the present invention, in an internal combustion engine in which a plurality of compression rings are mounted on a piston, one among the plurality of compression rings may be formed as a second ring mounted at a second position from a combustion chamber side.

Advantageous Effects of Invention

According to the present invention, it is possible to further reduce oil consumption of an internal combustion engine in a piston ring of an undercut shape.

DESCRIPTION OF EMBODIMENTS

Hereinafter, embodiments of the present invention will be described with reference to the drawings. In the embodiments described below, the present invention is applied to a second ring as an example of a piston ring. The second ring, in an internal combustion engine in which a plurality of compression rings are mounted on a piston, is a compression ring mounted at a second position from a combustion chamber side among the plurality of compression rings. However, the piston ring according to the present invention is not limited to the second ring. The present invention may be applied to a top ring, which is a compression ring mounted at a position closest to a combustion chamber, or to an oil ring mounted at a position farthest from the combustion chamber. In addition, the configurations described in the following embodiments are not intended to limit the technical scope of the invention only thereto unless otherwise specified.

In the following description, a "circumferential direction" refers to a circumferential direction of the piston ring unless otherwise specified. A "radial direction" refers to a radial direction of the piston ring unless otherwise specified. A "radially inner side" refers to an inner circumferential surface side of the piston ring, and a "radially outer side" refers to a side opposite thereto. An "axial direction" refers to a direction along a central axis of the piston ring unless otherwise specified. An "upper wall surface" of a ring groove of a piston refers to an inner wall of the ring groove on a combustion chamber side, and a "lower wall surface" refers to an inner wall of the ring groove on a crank chamber side.

Internal Combustion Engine

Figure 1:
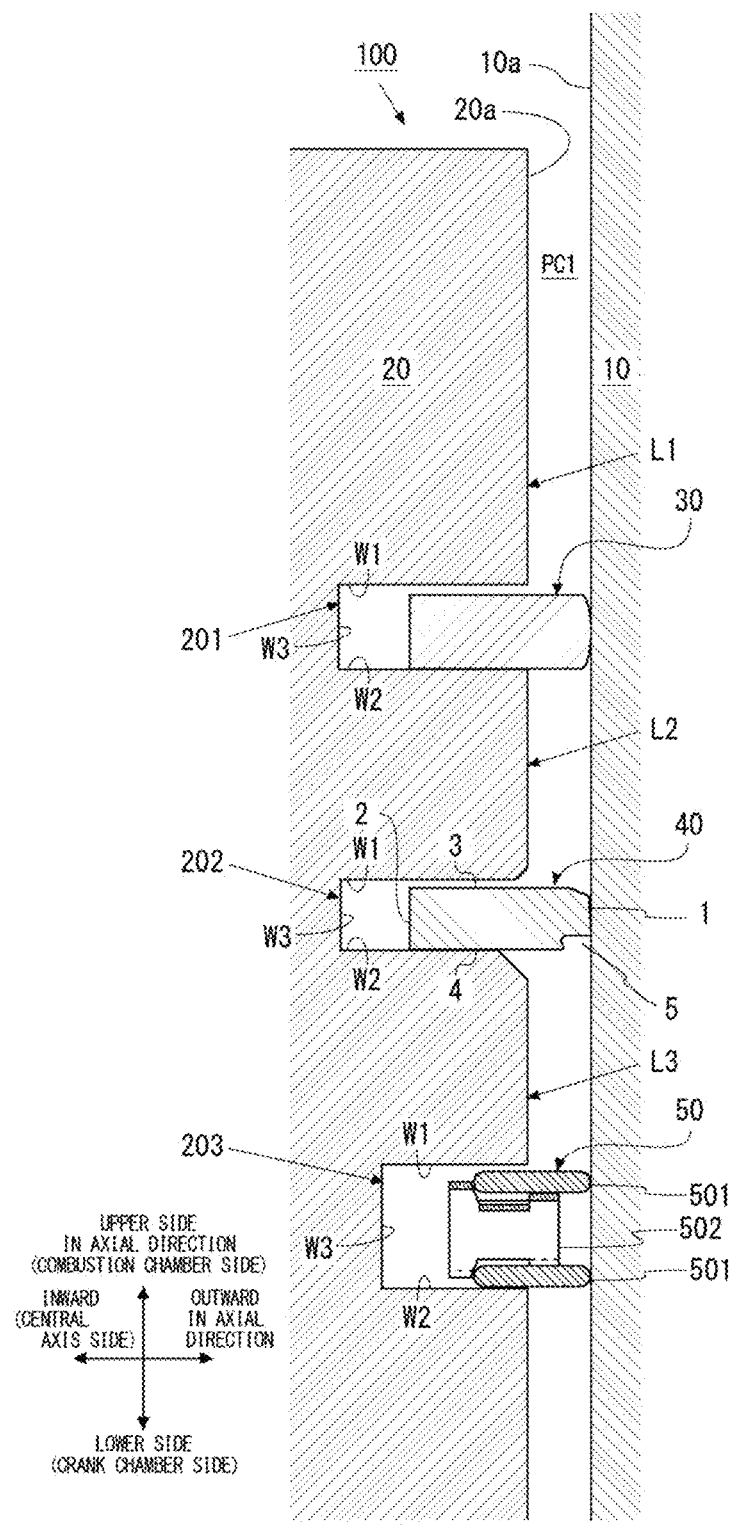
FIG. 1 is a cross-sectional view illustrating a part of an internal combustion engine including a second ring according to an embodiment.

FIG. 1 is a cross-sectional view illustrating a part of an internal combustion engine 100 including a second ring 40 according to an embodiment. In FIG. 1, a cross section along a central axis of a piston denoted by reference numeral 20 is illustrated. As illustrated in FIG. 1, the internal combustion engine 100 according to the first embodiment includes a cylinder 10, a piston 20 mounted (inserted) in the cylinder 10, and a plurality of piston rings 30, 40, 50 mounted on the piston 20. In the internal combustion engine 100 according to the embodiment, two compression rings (the top ring 30 and the second ring 40) and one oil ring 50 are mounted on the piston 20. Of the two compression rings, the top ring 30 is mounted at a position closest to the combustion chamber, and the second ring 40 is mounted at a second position from the combustion chamber side. The oil ring 50 is mounted at a position farthest from the combustion chamber.

As illustrated in FIG. 1, in the internal combustion engine 100, a clearance PC1 is formed by ensuring a predetermined separation distance between an outer circumferential surface 20a of the piston 20 and an inner wall surface 10a of the cylinder 10. In addition, on the outer circumferential surface 20a of the piston 20, a first ring groove 201, a second ring groove 202, and a third ring groove 203 are formed in this order from the upper side (combustion chamber side) at predetermined intervals in the axial direction of the piston 20. The ring grooves 201 through 203 are formed in the entire circumference of the outer circumferential surface 20a as grooves extending annularly around the axis of the piston 20. As illustrated in FIG. 1, each ring groove is formed to include a pair of upper and lower groove walls (inner walls) opposed to each other in the vertical direction. Of the pair of groove walls, the upper groove wall is referred to as an upper wall surface W1, and the lower groove wall is referred to as a lower wall surface W2. Also, in each ring groove, a groove wall that connects an inner peripheral edge of the upper wall surface W1 and an inner peripheral edge of the lower wall surface W2 is referred to as a bottom wall surface W3. As illustrated in FIG. 1, the top ring 30 is mounted in the first ring groove 201, the second ring 40 is mounted in the second ring groove 202, and the oil ring 50 is mounted in the third ring groove 203. Further, due to the formation of the ring grooves 201 through 203 on the piston 20, a top land L1, a second land L2, and a third land L3 are defined on the piston 20 in order from the combustion chamber side. Note that in this description, a state in which the respective piston rings are mounted on the piston 20 and the piston 20 is fitted into the cylinder 10 as illustrated in FIG. 1 may be referred to as a "use state".

The top ring 30 and the second ring 40 are compression rings, which are a type of piston rings, and are assembled to the piston fitted in the cylinder of the internal combustion engine, and slides on the inner wall surface of the cylinder in accordance with reciprocating motion of the piston. The top ring 30 and the second ring 40 are self-tensioned so that they press against the inner wall surface 10a of the cylinder 10 when mounted in the ring grooves. The oil ring 50 is a so-called three piece type oil ring, which is a type of piston ring, and includes a pair of segments 501, 501 that slide on the inner wall surface 10a of the cylinder 10, and a spacer expander 502 that urges these segments outward in the radial direction (toward the inner wall surface 10a side). Hereinafter, the second ring 40, which is an example of the piston ring according to the present invention will be described in detail.

Second Ring

As illustrated in FIG. 1, the second ring 40 has an outer circumferential surface 1, an inner circumferential surface 2, an upper surface 3, and a lower surface 4. The outer circumferential surface 1 is a surface provided on the outer circumference of the second ring 40. The inner circumferential surface 2 is a surface provided on the inner circumference of the second ring 40. The upper surface 3 is an end surface facing the upper side (combustion chamber side) in the internal combustion engine 100 among the axial end surfaces of the second ring 40. The lower surface 4 is an end surface facing the lower side (crank chamber side) in the internal combustion engine 100 (use state) among the axial end surfaces of the second ring 40. A width in the axial direction of the second ring 40 (hereinafter, also referred to as an axial width) is defined by the upper surface 3 and the lower surface 4. An the use state of the second ring 40, the upper surface 3 thereof faces the upper wall surface W1 of the second ring groove 202, the lower surface 4 thereof faces the lower wall surface W2 of the second ring groove 202, the outer circumferential surface 1 thereof is in sliding contact with the inner wall surface 10a of the cylinder 10, and the inner circumferential surface 2 faces a bottom wall surface W3 of the second ring groove 202. The second ring 40 has an annular shape in which an abutment joint (not shown) is formed. In addition, the second ring 40 is self-tensioned so that the outer circumferential surface 1 thereof presses against the inner wall surface 10a of the cylinder 10 when the second ring 40 is mounted in the second ring groove 202. Further, as illustrated in FIG. 1, the second ring 40 has an undercut shape in which a notched portion (undercut) denoted by reference numeral 5 is formed in a lower portion of the outer circumference of the second ring 40. The notched portion 5 extends in the circumferential direction of the second ring 40, and is formed over the entire circumference of the second ring 40. In the use state, the notched portion 5 serves as an oil reservoir, and when the second ring 40 scrapes off the oil in the clearance PC1 during the descent of the piston 20, the oil is buffered in the notched portion 5, thereby suppressing a rise in the oil pressure. As a result, good oil scraping performance can be obtained. Note that the notched portion 5 does not need to be formed over the entire circumference of the second ring 40, and for example, the notched portion 5 may not be formed in the vicinity of the abutment portion. That is, the notched portion 5 may be formed in the second ring 40 except abutment ends thereof forming the abutment portion. Thus, gas sealing performance can be enhanced.

Figure 2:
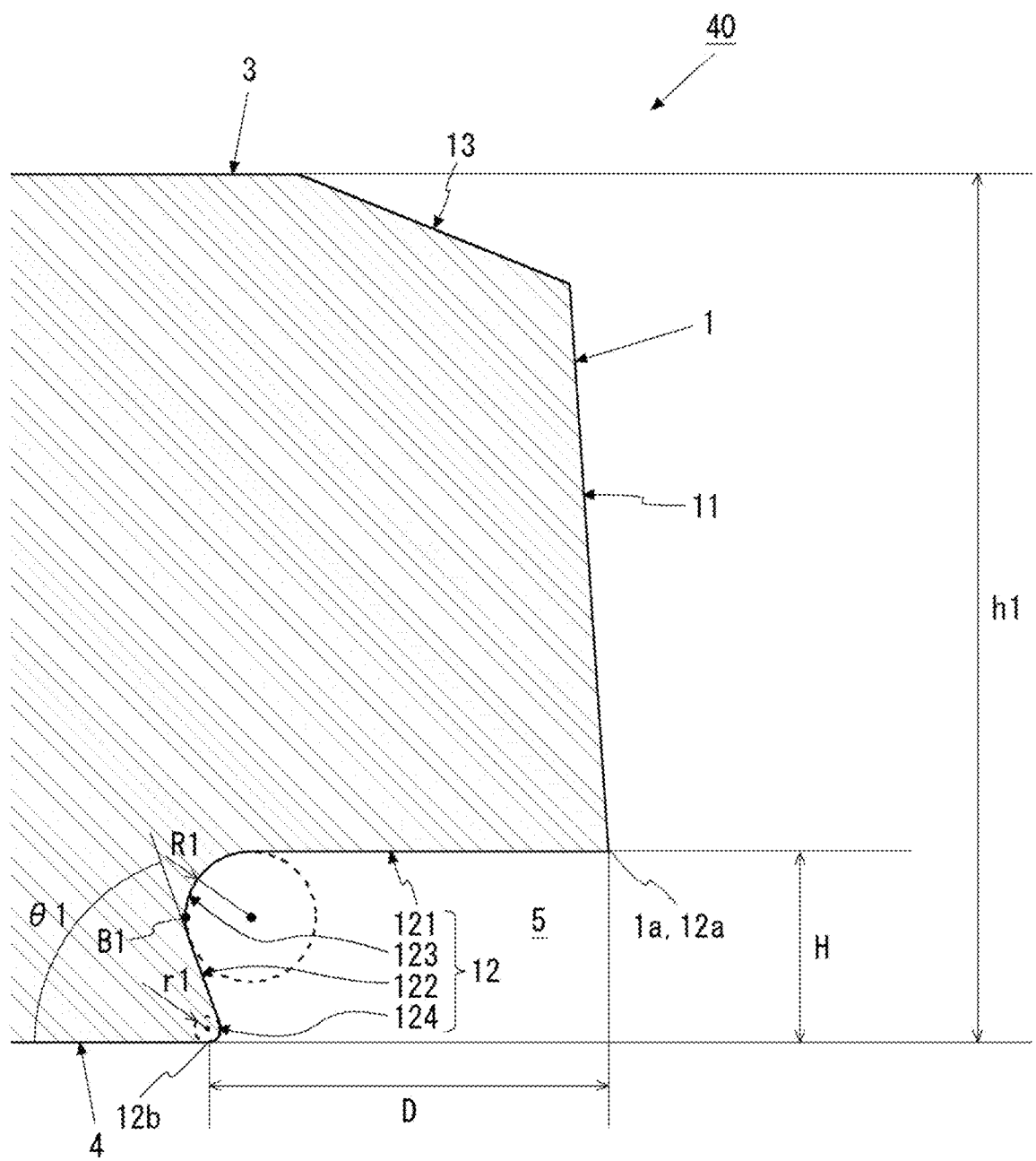
FIG. 2 is a cross-sectional view for explaining an outer circumferential surface of the second ring according to the embodiment.

FIG. 2 is a cross-sectional view for explaining the outer circumferential surface 1 of the second ring 40 according to the embodiment. In FIG. 2, a part of a cross section orthogonal to the circumferential direction of the second ring 40 is illustrated. As illustrated in FIG. 2, the outer circumferential surface 1 of the second ring 40 has a tapered surface 11, a cut surface 12, and a connecting surface 13.

As illustrated in FIG. 2, the tapered surface 11 is a surface that includes an outer circumferential end portion denoted by reference sign 1a, and slides on the inner wall surface 10a of the cylinder 10 in the internal-combustion engine 100. The outer circumferential end portion 1a is a maximum-diameter portion of the second ring 40 in a cross section orthogonal to the circumferential direction of the second ring 40. The outer circumferential end portion 1a illustrated in FIG. 2 is formed as an edge, but may also be formed as a rounded surface. The tapered surface 11 is inclined to approach the central axis of the second ring 40 (i.e., to reduce the diameter) as it extends upward (toward the combustion chamber side) from the outer circumferential end portion 1a with the outer circumferential end portion 1a as a lower edge. Thus, the outer circumferential shape of the second ring 40 according to the embodiment is a tapered undercut shape. The tapered surface 11 corresponds to an "outer circumferential end surface" according to the present invention. The outer circumferential end surface according to the present invention may be a straight surface having a uniform outer diameter regardless of the position in the axial direction. In this case, the entire straight surface is the outer circumferential end portion. In addition, the outer circumferential end surface according to the present invention may have a barrel shape curved to be convex outward in the radial direction. In this case, the apex of the barrel shape is the outer circumferential end portion, and an undercut is formed downward from the apex.

As illustrated in FIG. 2, the connecting surface 13 connects the upper edge of the tapered surface 11 and the outer circumferential edge of the upper surface 3. Note that in the present invention, the connecting surface 13 is not an essential component.

As illustrated in FIG. 2, the cut surface 12 is provided so as to form the notched portion 5 between the tapered surface 11 and the lower surface 4, and connects the tapered surface 11 and the lower surface 4. The cut surface 12 is configured to include a bottom portion B1, a first surface 121, a second surface 122, a third surface 123, and a lower R surface 124.

As illustrated in FIG. 2, the bottom portion B1 is a portion of the cut surface 12 that is positioned on the innermost side in the radial direction of the second ring 40. In other words, the bottom portion B1 is a portion of the cut surface 12 that is closest to the center line of the second ring 40 and that constitutes the deepest portion of the notched portion 5.

As illustrated in FIG. 2, the first surface 121 is a surface provided between the tapered surface 11 and the bottom portion B1, and faces (or is directed toward) the lower side (the crank chamber side). At this time, the first surface 121 according to the present example is arranged parallel to the lower surface 4 and orthogonal to the axial direction of the second ring 40. Since the first surface 121 is parallel to the lower surface 4, it is easy to machine the notched portion 5 (cut surface 12). In addition, the outer circumferential edge of the first surface 121 is connected to the outer circumferential end portion 1a which is the lower edge of the tapered surface 11. However, the present invention is not limited to this. The first surface 121 may be inclined with respect to the lower surface 4. Further, another surface (e.g., an R surface) may be interposed between the first surface 121 and the tapered surface 11.

As illustrated in FIG. 2, the second surface 122 is a surface arranged between the bottom portion B1 and the lower surface 4, and faces (is directed) outward in the radial direction of the second ring 40 (the inner wall surface 10a side of the cylinder 10). The second surface 122 is inclined away from the central axis of the second ring 40 in a direction toward the lower side (the crank chamber side). Here, as illustrated in FIG. 2, let $\theta1$ be an angle of a corner formed by the second surface 122 and the lower surface 4 in a cross section orthogonal to the circumferential direction of the second ring 40, i.e., an angle of inclination of the second surface 122 with respect to the lower surface 4. In the second ring 40 according to the embodiment, $\theta1$ is an acute angle. More precisely, $\theta1$ is set such that $50° \leq \theta1 \leq 85°$.

As illustrated in FIG. 2, the third surface 123 is a surface connecting the first surface 121 and the second surface 122. The third surface 123 includes the bottom portion B1. The third surface 123 is curved in a concave shape. The third surface 123 according to the embodiment is an R surface formed in an arc shape, and a radius of curvature R1 thereof is constant in the entire region of the third surface 123. In other words, the third surface 123 according to the embodiment is formed by a single arc in which the curvature thereof does not change. In the second ring 40 according to the embodiment, R1 is set such that $0.05 \text{ mm} \leq R1 \leq 0.2 \text{ mm}$. However, the present invention is not limited to this. Note that in the present invention, the shape of the third surface is not limited to an arc shape. For example, the third surface may be formed such that the curvature thereof partially changes.

As illustrated in FIG. 2, the lower R surface 124 connects the lower edge of the second surface 122 and the outer circumferential edge of the lower surface 4. The lower R surface 124 is a so-called corner R, and is formed in an arc shape so as to be convex in a cross section orthogonal to the circumferential direction of the second ring 40. As illustrated in FIG. 2, let r1 be the radius of curvature of the lower R surface 124. Note that in the present invention, the lower R surface 124 is not an essential component.

Here, as illustrated in FIG. 2, let h1 be the axial width of the second ring 40. In addition, in FIG. 2, reference sign 12a denotes a connecting portion between the cut surface 12 and the tapered surface 11, and reference sign 12b denotes a connecting portion between the cut surface 12 and the lower surface 4. In the second ring 40 according to the embodiment, the connecting portion 12a coincides with the outer circumferential end portion 1a. In this case, let H be a distance between the connecting portion 12a and the connecting portion 12b in the axial direction of the second ring 40, and let D be a distance between the connecting portion 12a and the connecting portion 12b in the radial direction of the second ring 40. In the second ring 40 according to the embodiment, h1 and H are set such that $0.2 \leq H/h1 \leq 0.4$. Note that the range of h1 is not particularly limited, but for example, $0.8 \text{ mm} \leq h1 \leq 2.5 \text{ mm}$ is preferred.

Oil Sealing Performance

Figure 3:
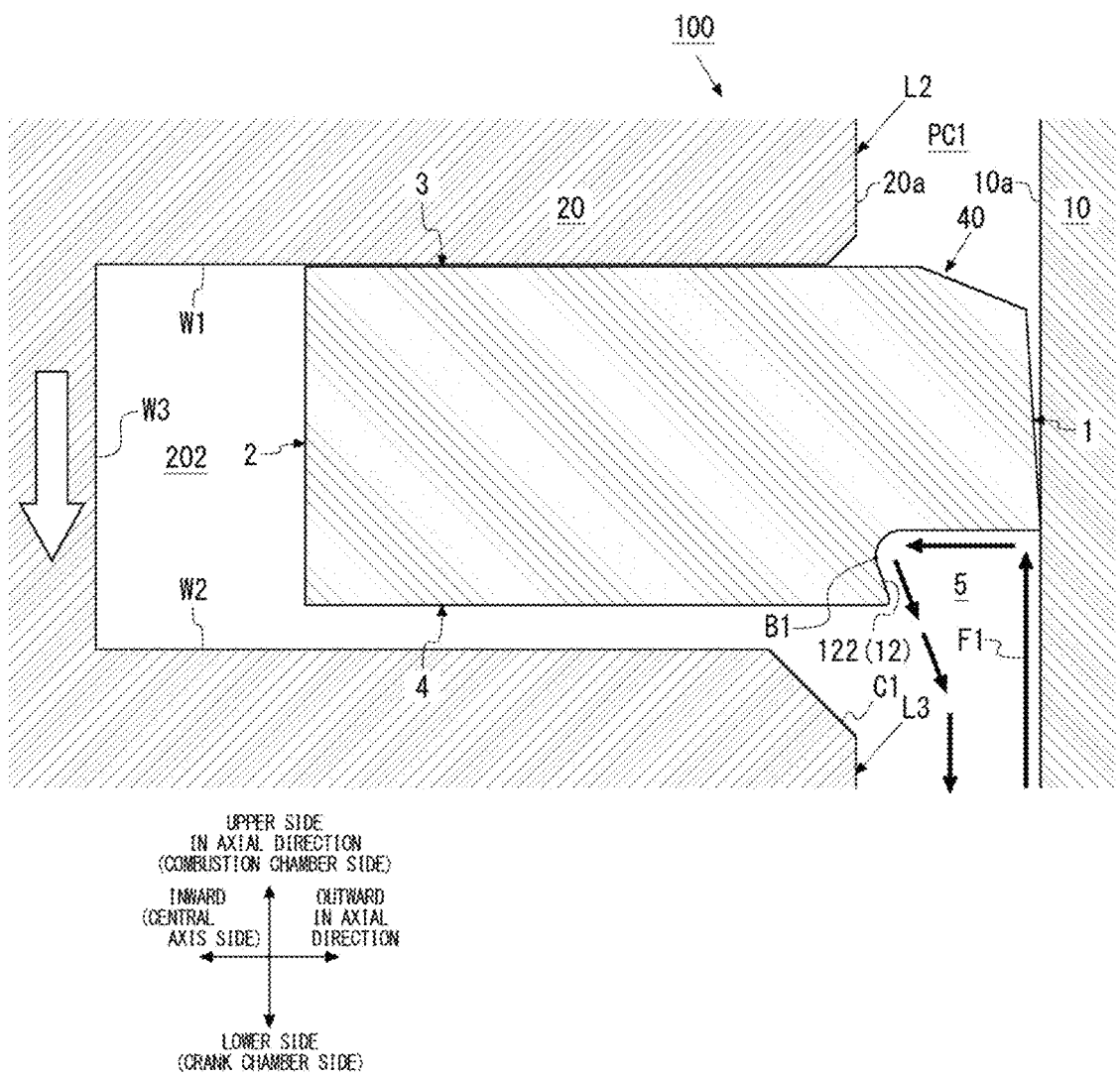
FIG. 3 is a cross-sectional view of the vicinity of the second ring when a piston is on a downward stroke in the internal combustion engine according to the embodiment.
Figure 4:
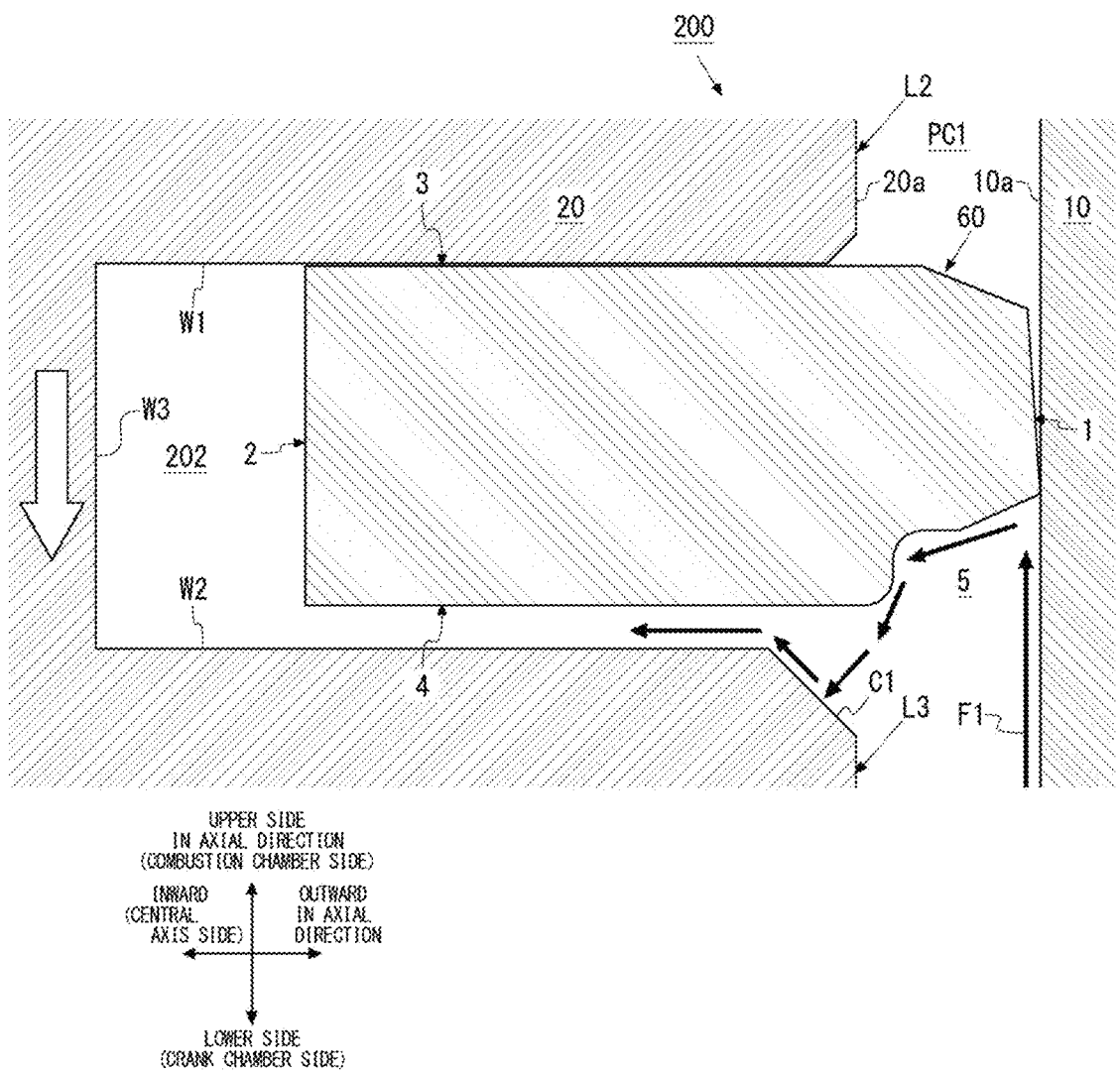
FIG. 4 is a cross-sectional view of the vicinity of a second ring when a piston is on a downward stroke in an internal combustion engine according to Comparative Example 1.

Hereinafter, oil scraping performance of the second ring 40 according to the embodiment will be described. FIG. 3 is a cross-sectional view of the vicinity of the second ring 40 when the piston 20 is on a downward stroke in the internal combustion engine 100 according to the embodiment. FIG. 4 is a cross-sectional view of the vicinity of a second ring 60 when a piston 20 is on a downward stroke in an internal combustion engine 200 according to Comparative Example 1. FIG. 3 and FIG. 4 illustrate cross-sections along the central axis of each piston 20. The internal combustion engine 200 according to Comparative Example 1 illustrated in FIG. 4 differs from the internal combustion engine 100 according to the embodiment in that the conventional second ring 60 having a tapered undercut shape is mounted in a second ring groove 202 of the piston 20, instead of the second ring 40 according to the embodiment. Here, reference sign F1 in FIGS. 3 and 4 indicates a relative flow of a part of the oil existing on the inner wall surface 10a of the cylinder 10 with respect to the piston 20. Further, reference sign C1 indicates a chamfered portion formed between the lower wall surface W2 of the second ring groove 202 and the outer circumferential surface 20a of the piston 20.

As illustrated in FIG. 4, in the internal combustion engine 200 according to Comparative Example 1, a part of the oil scraped off by the second ring 60 may flow on the surface of its undercut. In that case, the part of the oil may hit the chamfered portion C1 of the second ring groove 202 without being dropped into the clearance PC1, and may flow into a space between the lower surface 4 of the second ring 60 and the lower wall surface W2 of the second ring groove 202. Therefore, in Comparative Example 1, the part of the oil that has flowed into the space between the lower surface 4 of the second ring 60 and the lower wall surface W2 of the second ring groove 202 may flow out to the combustion chamber side, which may increase the amount of oil consumption.

In contrast to this, in the internal combustion engine 100 according to the embodiment, the outer circumferential surface 1 of the second ring 40 has the second surface 122 inclined at an angle of 50° or more and 85° or less with respect to the lower surface 4 as described above. Therefore, as illustrated in FIG. 3, a part of the oil scraped off by the second ring 40 flows from the bottom portion B1 along the slope of the second surface 122 and is thereby released to the outer circumferential side of the second ring 40. As a result, the part of the oil is dropped into the clearance PC1 of the third land L3 and flows to the crank chamber side. This prevents the oil from flowing between the lower surface 4 of the second ring 40 and the lower wall surface W2 of the second ring groove 202.

Operation and Effect

As described above, the cut surface 12 forming the notched portion 5 in the second ring 40 according to the embodiment includes the above-mentioned second surface 122 which is provided between the bottom portion B1 and the lower surface 4 and faces outward in the radial direction, and the second surface 122 is inclined away from the central axis of the second ring 40 toward the lower side, and the angle of inclination $\theta1$ with respect to the lower surface 4 is greater than or equal to 50° and less than or equal to 85°. Further, in the second ring 40 according to the embodiment, H/h1 is greater than or equal to 0.2 and less than or equal to 0.4.

If $\theta1$ is less than 50°, the oil flowing along the second surface 122 may hit the inner wall surface 10a of the cylinder 10, and the oil may not be dropped smoothly into the piston clearance PC1. On the other hand, if $\theta1$ is greater than 85°, there is a possibility that the oil flowing along the second surface 122 will not be dropped into the clearance PC1 and may flow into between the lower surface of the second ring 40 and the lower wall surface W2 of the second ring groove 202. By setting $50° \leq \theta1 \leq 85°$, the second ring 40 according to the embodiment allows the oil flowing along the slope of the second surface 122 to escape to the outer circumferential side of the second ring 40, thereby facilitating the oil to drop into the clearance PC1. Note that it is more preferable to set θ1 such that 50°≤θ1≤80°, and even more preferably, 60°≤θ1≤80°.

In addition, if H/h1 is smaller than 0.2, the volume of the notched portion 5 cannot be sufficiently secured, and the oil scraping performance is reduced. Further, if H/h1 is greater than 0.4, the axial width of the tapered surface 11, which is a surface sliding on the inner wall surface 10a of the cylinder 10, cannot be sufficiently secured. By setting 0.2≤H/h1≤0.4, the second ring 40 according to the embodiment can secure the axial width of the sliding surface while suppressing the reduction in the amount of oil scraped off. Note that H/h1 is more preferably set such that 0.2≤H/h1≤0.3.

Thus, the second ring 40 according to the embodiment, which is configured as described above, can improve the oil sealing performance and reduce the oil consumption of the internal combustion engine 100.

Here, note that from the viewpoint of improving the oil sealing performance, the radius of curvature r1 of the lower R surface 124 is preferably set to 0.01 mm≤r1≤0.2 mm, and more preferably 0.05 mm≤r1≤0.2 mm. Also, from the same viewpoint, D is more preferably set to 0.2 mm≤D≤0.6 mm, and still more preferably, 0.2 mm≤D≤0.5 mm. In addition, from the same viewpoint, H is more preferably set to 0.2 mm≤H≤0.6 mm. However, the present invention is not limited to these numerical values. If r1 is less than 0.01 mm, chipping may occur at corner portions during the grinding of the lower surface 4 of the second ring 40. If r1 is greater than 0.2 mm, the proportion of the second surface 122 in the entire cut surface 12 is reduced. As a result, it is considered that the amount of oil flowing on the ring lower surface and the amount of oil riding up on the piston chamfer increase (i.e., oil is guided to the ring lower surface by the enlargement of r1), and the amount of oil dropped to the crank chamber side decreases.

In the second ring 40 according to the embodiment, the cut surface 12 includes the third surface 123 that includes the bottom portion B1 and connects the first surface 121 and the second surface 122 to each other, the third surface 123 is curved in a concave shape, and the radius of curvature of the third surface 123 is greater than or equal to 0.05 mm and less than or equal to 0.2 mm. According to this, a part of the oil scraped off by the second ring 40 flows along the curvature of the third surface 123, and hence is easily guided to the second surface 122. Thus, the oil can be easily dropped into the clearance PC1, so that the oil consumption can be further reduced.

Modification

Figure 5:
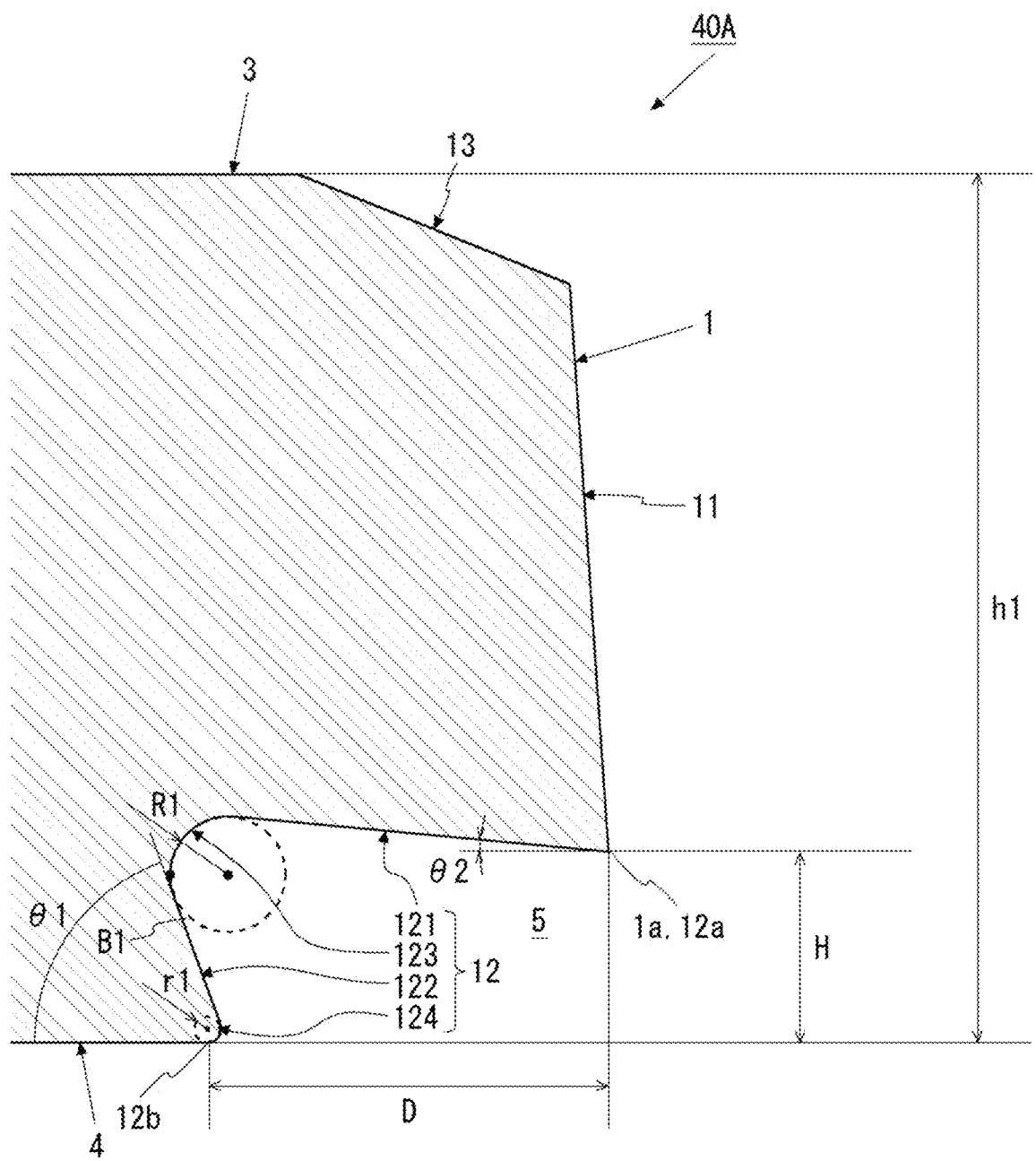
FIG. 5 is a cross-sectional view for explaining an outer circumferential surface of a second ring according to a modification of the embodiment.

FIG. 5 is a cross-sectional view for explaining an outer circumferential surface 1 of a second ring 40A according to a modification of the above embodiment. FIG. 5 illustrates a part of a cross section orthogonal to the circumferential direction of the second ring 40A. As illustrated in FIG. 5, the second ring 40A is different from the above-described second ring 40 in that a first surface 121 of a cut surface 12 is inclined with respect to a lower surface 4.

As illustrated in FIG. 5, in the second ring 40A according to the modification, the first surface 121 is inclined away from the crank chamber as it extends inward in the radial direction of the second ring 40A. Here, as illustrated in FIG. 5, in a cross section orthogonal to the circumferential direction of the second ring 40A, let θ2 be an angle of inclination of the first surface 121 with respect to the lower surface 4. In the second ring 40A according to the modification, θ2 is set such that 0°<θ2≤30°. Note that θ2 may be set in a range of, for example, 0.5°≤θ2≤30°.

In the second ring 40A according to the modification, since the first surface 121 is inclined as described above, a part of the oil scraped off by the second ring 40A flows along the slope of the first surface 121 and is easily guided to the second surface 122. Thus, the oil can be easily dropped into the clearance PC1, so that the oil consumption can be further reduced.

<Oil Sealing Performance Evaluation>

The oil sealing performance of the second ring according to the embodiment was evaluated by analysis using analytical software. In the evaluation of the oil sealing performance, the amount of oil flowing out during the downward stroke of the piston in the internal combustion engine was analyzed.

Comparison by Shape

Figure 6:
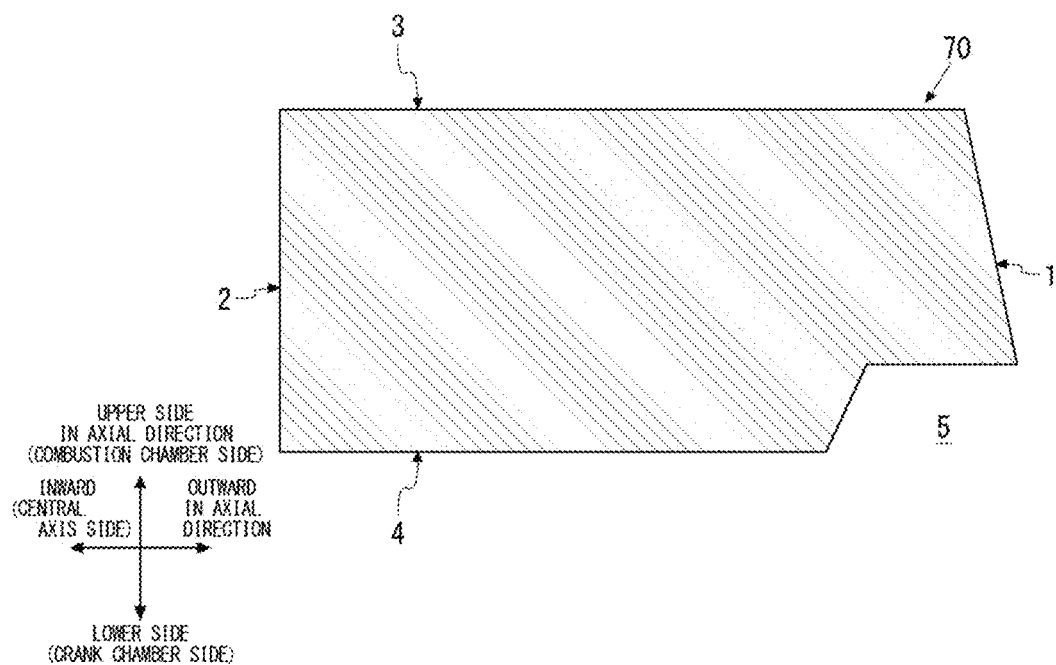
FIG. 6 is a cross-sectional view of a second ring according to Comparative Example 2.
Figure 7:
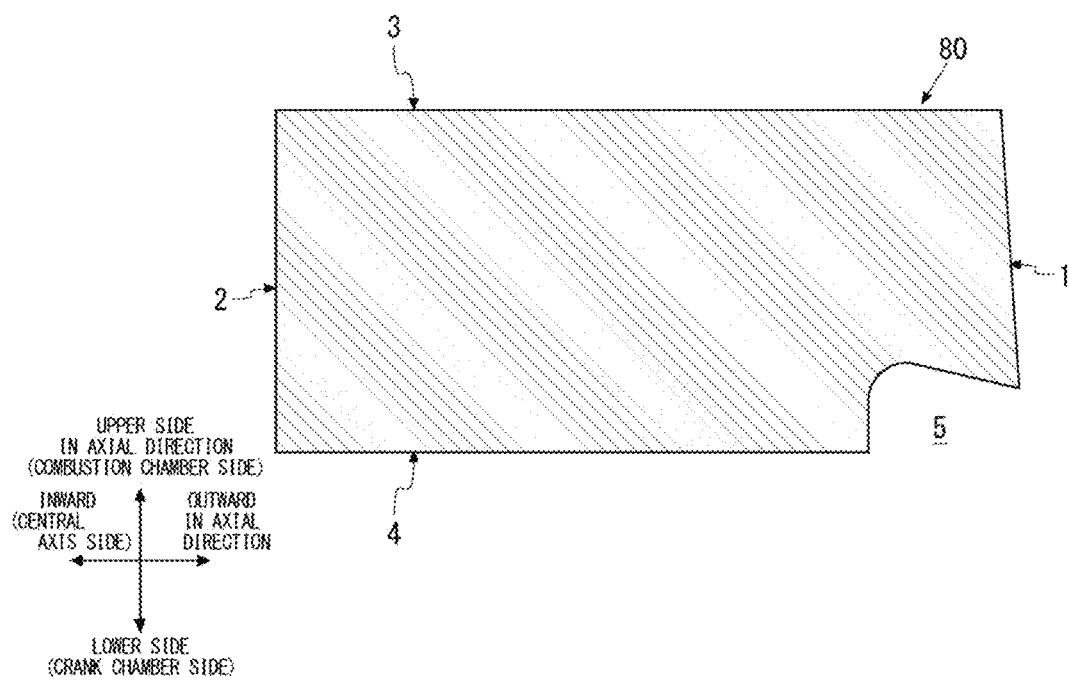
FIG. 7 is a cross-sectional view of a second ring according to Comparative Example 3.

As Examples 1 and 2, the oil sealing performances of second rings 40 according to the embodiment illustrated in FIG. 2 were evaluated. In Example 1, a second ring with h1=1.5 mm, H=0.3 mm, H/h1=0.2, D=0.4 mm, θ1=80°, and θ2=0° was used. In Example 2, a second ring with h1=1.5 mm, H=0.3 mm, H/h1=0.2, D=0.4 mm, θ1=70°, and θ2=0° was used. Further, as Examples 3 and 4, the oil sealing performances of second rings 40A according to the modification of the embodiment illustrated in FIG. 5 were evaluated. In Example 3, a second ring with h1=1.5 mm, H=0.3 mm, H/h1=0.2, D=0.4 mm, θ1=83°, and θ2=13.5° was used. In Example 4, a second ring with h1=1.5 mm, H=0.3 mm, H/h1=0.2, D=0.4 mm, θ1=80°, and θ2=10° was used. As Comparative Example 1, the oil sealing performance of the second ring 60 according to Comparative Example 1 illustrated in FIG. 4 was evaluated. Also, as Comparative Example 2, the oil sealing performance of a second ring disclosed in Patent Literature 3 (International Publication WO 2016/121483) was evaluated. FIG. 6 is a cross-sectional view of a second ring 70 according to Comparative Example 2. As Comparative Example 3, the oil sealing performance of a second ring having a so-called Napier shape was evaluated. FIG. 7 is a cross-sectional view of a second ring 80 according to Comparative Example 3. FIG. 6 and FIG. 7 illustrate cross sections orthogonal to the circumferential direction.

Comparison Results

Figure 8:
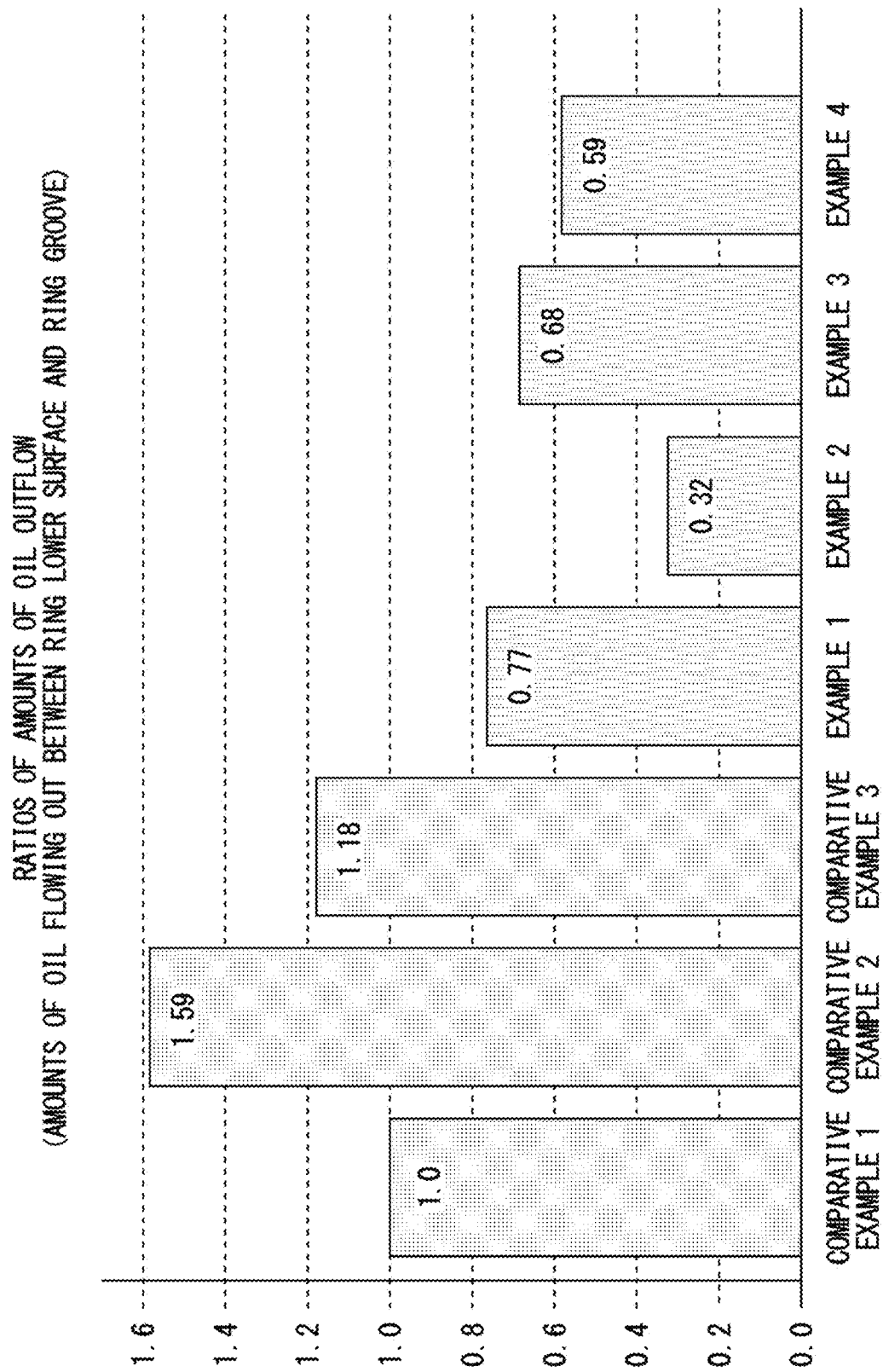
FIG. 8 is a graph illustrating analysis results of the amount of oil outflow.

FIG. 8 is a graph illustrating the analysis results of the amounts of oil outflow. FIG. 8 illustrates the ratios of the amounts of oil outflow relative to that in Comparative Example 1. The ratios of the amounts of oil outflow represented by the vertical axis in FIG. 8 is the ratios of the amounts of oil flowing out between the lower surface of the second ring and the lower wall surface of the ring groove. As illustrated in FIG. 8, with respect to the amount of oil flowing out between the lower surface of the second ring and the lower wall surface of the ring groove, the ratios of Comparative Examples 2 and 3 to Comparative Example 1 were 1.59 and 1.18, respectively. In addition, the ratios of Examples 1 through 4 to Comparative Example 1 were 0.77, 0.32, 0.68, and 0.59, respectively. From the analysis results of FIG. 8, it is found that the amounts of oil flowing out between the lower surface of the second ring and the lower wall surface of the ring groove are reduced in Examples 1 through 4 as compared with Comparative Examples 1 through 3.

Parameter Evaluation

Figure 9:
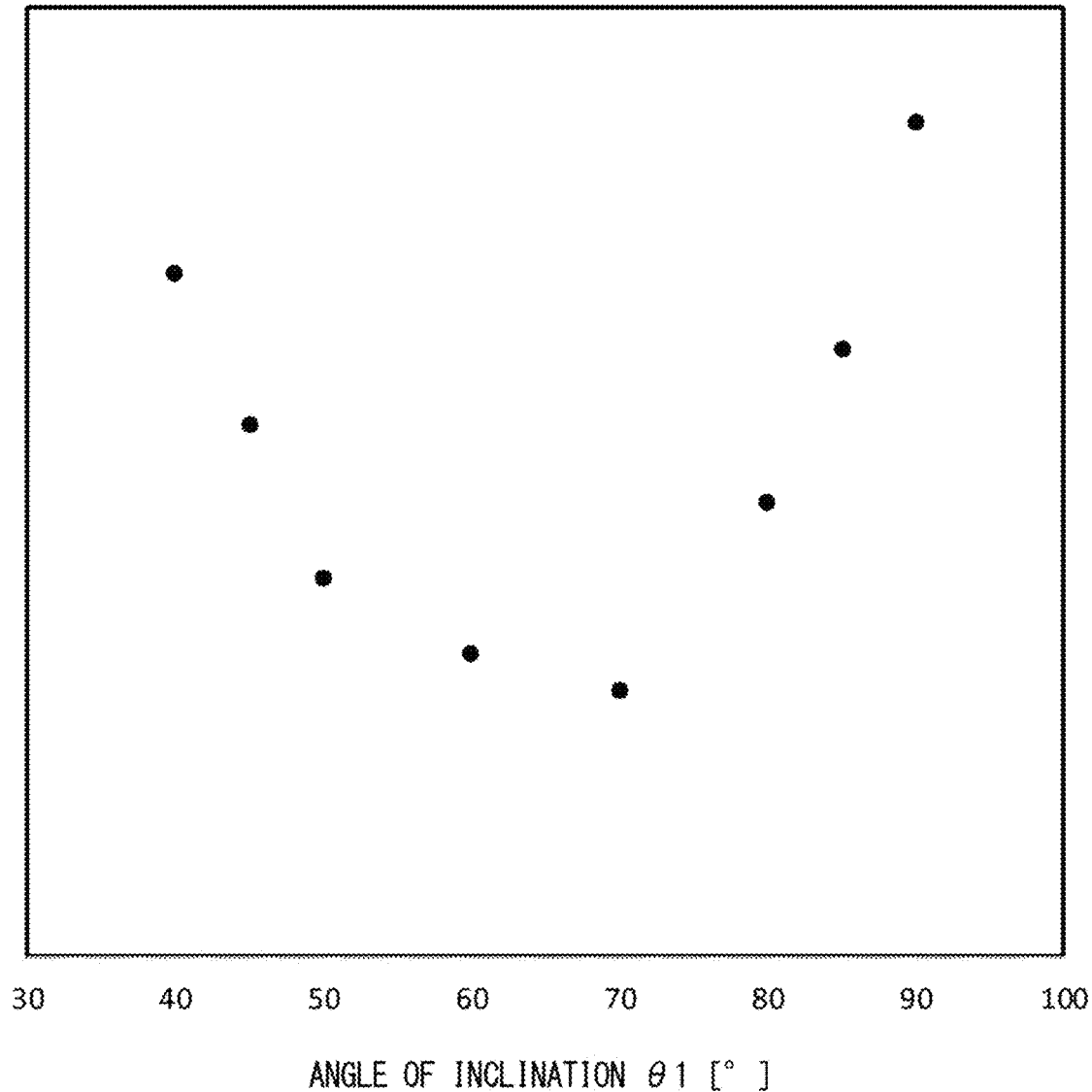
FIG. 9 is a graph illustrating a relationship between θ1 and the amount of oil outflow.
Figure 10:
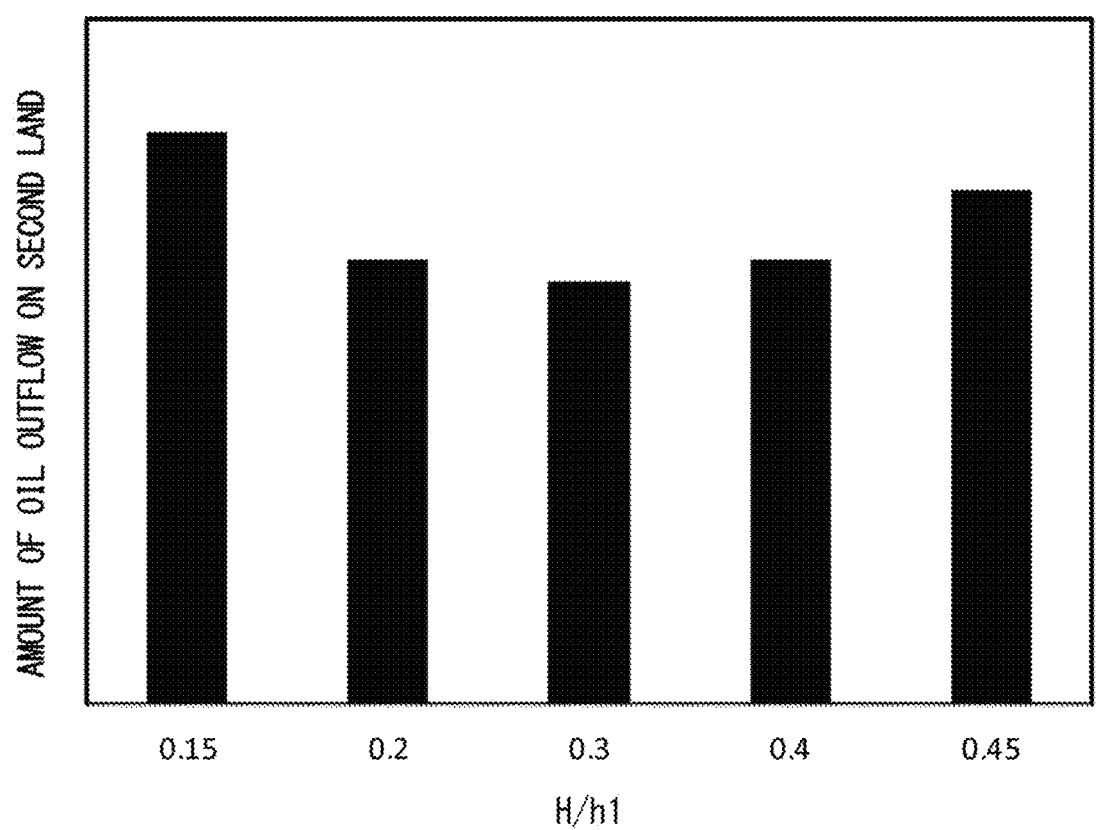
FIG. 10 is a graph illustrating a relationship between H/h1 and the amount of oil outflow.
Figure 11:
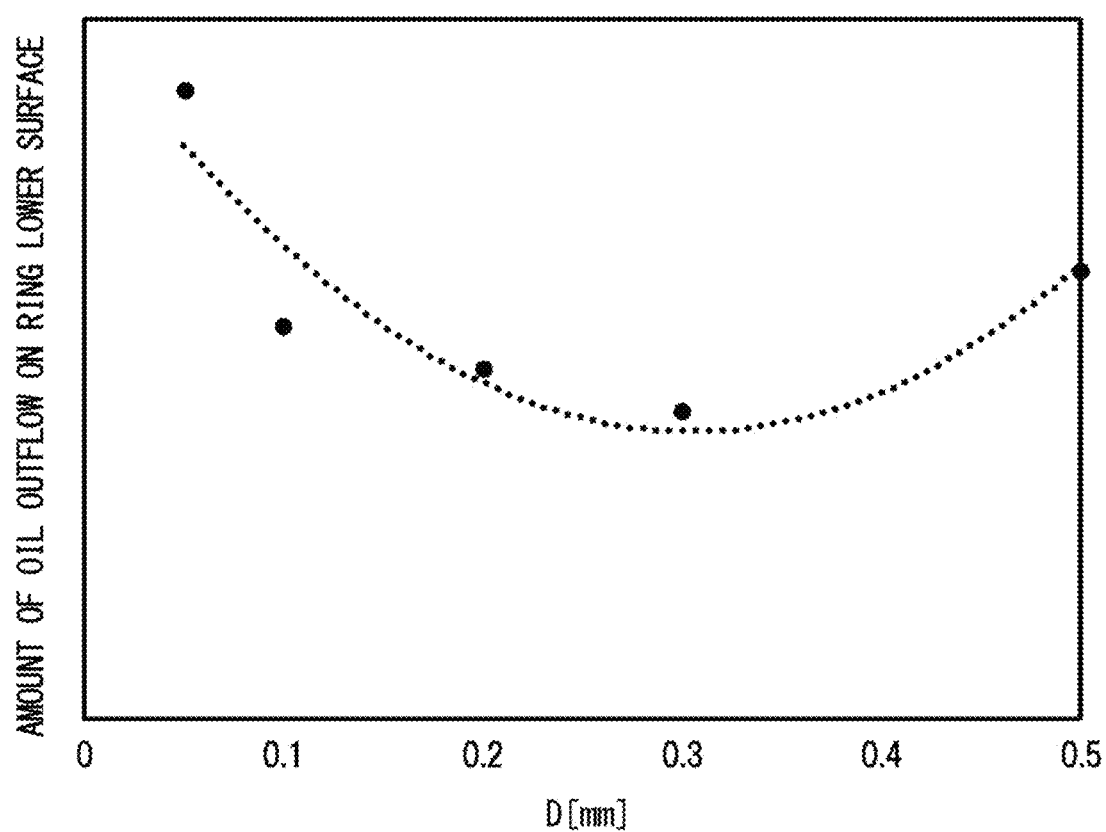
FIG. 11 is a graph illustrating a relationship between D and the amount of oil outflow.

In the second ring 40 according to the embodiment, the oil sealing performance was evaluated when the angle of inclination θ1 and H/h1 were varied. FIG. 9 is a graph illustrating a relationship between θ1 and the amount of oil outflow. In FIG. 9, there is illustrated the relationship between θ1 and the amount of oil outflow with h1=1.5 mm, H=0.3 mm, H/h1=0.2, D=0.4 mm, θ2=0°, and θ1=40°, 45°, 50°, 60°, 70°, 80°, 85°, and 90°. The amount of oil outflow, represented by the vertical axis in FIG. 9, is the amount of oil that flows out between the lower surface of the second ring and the lower wall surface of the ring groove. As illustrated in FIG. 9, it is found that the amount of oil flowing out between the lower surface of the second ring and the lower wall surface of the ring groove is reduced when θ1 is around 70°. Also, FIG. 10 is a graph illustrating a relationship between H/h1 and the amount of oil outflow. FIG. 10 illustrates the relationship between H/h1 and the amount of oil outflow when H/h1=0.15, 0.2, 0.3, 0.4, and 0.45 in the second ring according to the embodiment. The amount of oil outflow, represented by the vertical axis in FIG. 10, is the amount of oil that flows out to the second land through the space between the outer circumferential surface of the second ring and the inner wall surface of the cylinder. As illustrated in FIG. 10, the amount of oil flowing out to the second land is relatively smaller in the cases of H/h1=0.2, 0.3, and 0.4 than in the cases of H/h1=0.15 and 0.45. Thus, it is found that the amount of oil flowing out to the second land is reduced by setting H/h1 to 0.2 or more and 0.4 or less. In addition, FIG. 11 is a graph illustrating a relationship between D and the amount of oil outflow. FIG. 11 illustrates the relationship between D and the amount of oil outflow when D=0.05 mm, 0.1 mm, 0.2 mm, 0.3 mm, and 0.5 mm in the second ring according to the embodiment. The amount of oil outflow, represented by the vertical axis in FIG. 11, is the amount of oil that flows out between the lower surface of the second ring and the lower wall surface of the ring groove. As illustrated in FIG. 11, it is found that the amount of oil flowing out between the lower surface of the second ring and the lower wall surface of the ring groove is reduced in the range of 0.2 mm≤D≤0.5 mm. In particular, it is found that the amount of oil outflow is the smallest when D is in the vicinity of 0.3 mm. That is, in the range of D<0.3 mm, the amount of oil outflow increases as D decreases. This is considered to be because the oil on the inner wall surface of the cylinder and the oil in the undercut portion (notched portion) of the ring interfere with each other to generate a vortex of the oil, and the oil having a reduced flow velocity flows along the lower surface of the ring. Further, in the range of D>0.3 mm, the amount of oil outflow increases as D increases. This is considered to be because the amount of oil flowing along the lower surface of the ring increases due to an increase in the amount of oil hitting the chamfered portion of the piston.

<Flow Distribution Evaluation>

Figure 12:
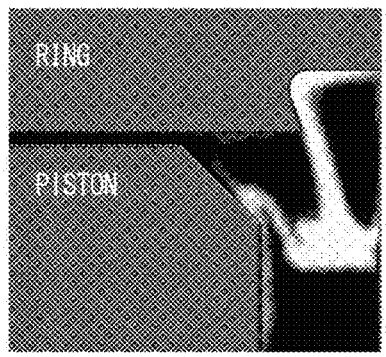
FIG. 12 is a view illustrating analysis results of the flow distribution of oil.
Figure 12:
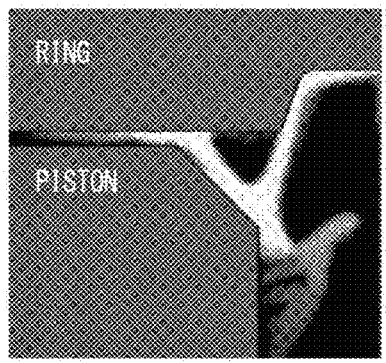
Figure 12:
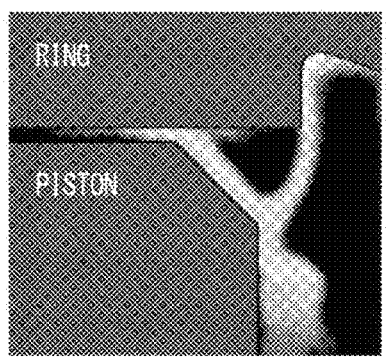
Figure 12:
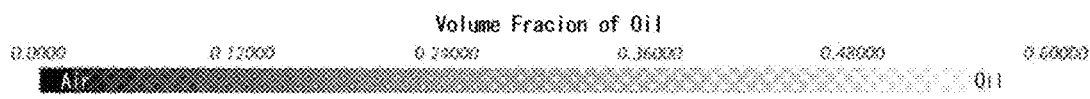

The flow of oil was analyzed by analytical software when the second ring according to the embodiment was used. FIG. 12 is a view illustrating analysis results of flow distributions of oil in the vicinity of the second ring of the internal combustion engine on the downward stroke of the piston. In FIG. 12, the gradation scale of "Volume Fraction of Oil" represents the volume fraction of oil. In the analysis results in FIG. 12, black areas have a low proportion of oil (more air) and white areas have a high proportion of oil (more oil).

In FIG. 12, the respective flow distributions for Example 2, Comparative Example 2, and Comparative Example 3 described above are illustrated. As illustrated in FIG. 12, it can be seen that the amount of oil flowing out between the lower surface of the second ring and the lower wall surface of the ring groove is small in Example 2, compared to Comparative Example 2 and Comparative Example 3.

Although the preferred forms of embodiment of the present invention have been described above, the above-described various forms can be combined with one another as long as such combinations are possible and appropriate. Note that although the subject of application of the invention is not limited, the piston ring according to the present invention can be suitably applied to a spark-ignition engine, as exemplified by a gasoline engine, among internal combustion engines. However, the piston ring according to the present invention may be applied to a compression ignition engine, as exemplified by a diesel engine. In addition, when the piston ring according to the present invention is applied to a spark ignition engine as a second ring, it is particularly desirable to have the outer circumference of a top ring in the shape of a barrel and the outer circumference of a segment of an oil ring in the shape of a barrel, as illustrated in FIG. 1. Thus, the gas sealing performance and the oil sealing performance can be secured while suppressing an increase in friction. It should be noted that the "barrel shape" refers to an outer circumferential surface shape of the piston ring which is curved so as to be convex outward in the radial direction including an apex having a maximum diameter, and includes a symmetrical barrel shape in which an apex thereof is positioned at the vertical center and an eccentric barrel shape in which an apex thereof is offset upward or downward from the vertical center.

DESCRIPTION OF SYMBOLS

1: outer circumferential surface
1a: outer circumferential end portion
11: tapered surface (example of outer circumferential end surface)
12: cut surface
121: first surface
122: second surface
123: third surface
2: inner circumferential surface
3: upper surface
4: lower surface
5: notched portion
10: cylinder
20: piston
40: second ring (example of piston ring)
100: internal combustion engine

The invention claimed is:

1. A piston ring mounted on a piston of an internal combustion engine, comprising:
   an outer circumferential surface provided on an outer circumference of the piston ring; an inner circumferential surface provided on an inner circumference of the piston ring; an upper surface facing a combustion chamber side in the internal combustion engine among axial end surfaces of the piston ring; and a lower surface positioned on a crank chamber side in the internal combustion engine among the axial end surfaces of the piston ring; wherein the outer circumferential surface includes: an outer circumferential end surface including an outer circumferential end portion having a maximum diameter in the piston ring in a cross section orthogonal to a circumferential direction of the the piston ring; and a cut surface connecting the outer circumferential end surface and the lower surface so as to form a notched portion extending in the circumferential direction of the piston ring between the outer circumferential end surface and the lower surface;

the cut surface includes: a bottom portion positioned on an innermost side of the cut surface in a radial direction of the piston ring; a first surface provided between the outer circumferential end surface and the bottom portion and facing the crank chamber side; and a second surface provided between the bottom portion and the lower surface and facing outward in the radial direction;

the second surface is inclined away from a central axis of the piston ring as it extends toward the crank chamber side;

an angle of inclination of the second surface with respect to the lower surface in a cross section orthogonal to the circumferential direction of the piston ring is greater than or equal to 50° and less than or equal to 85°;

when an axial width of the piston ring is h1 and a distance in an axial direction between a connecting portion between the cut surface and the outer circumferential end surface and a connecting portion between the cut surface and the lower surface is H, H/h1 is greater than or equal to 0.2 and less than or equal to 0.4;

the connecting portion between the cut surface and the lower surface is positioned radially inward of the connecting portion between the cut surface and the outer circumferential end surface; and the cut surface is configured to allow oil flowing along the second surface to escape to an outer circumferential side of the piston ring.

2. The piston ring according to claim 1, wherein
when a distance in the radial direction of the piston ring between the connecting portion of the cut surface and the outer circumferential end surface and the connecting portion of the cut surface and the lower surface is D, the distance D is 0.2 mm≤D≤0.6 mm.

3. The piston ring according to claim 1, wherein
the first surface is inclined away from the crank chamber as it extends inward in the radial direction of the piston ring; and
an angle of inclination of the first surface with respect to the lower surface in the cross section orthogonal to the circumferential direction of the piston ring is less than or equal to 30°.

4. The piston ring according to claim 1, wherein
the cut surface includes the bottom portion and a third surface that connects the first surface and the second surface;
the third surface is curved in a concave shape; and
a radius of curvature of the third surface is greater than or equal to 0.05 mm and less than or equal to 0.2 mm.

5. The piston ring according to claim 1, wherein
the cut surface further includes a lower R surface connecting the second surface and the lower surface; and
a radius of curvature of the lower R surface is greater than or equal to 0.01 mm and less than or equal to 0.2 mm.

6. The piston ring according to claim 1, wherein
in the internal combustion engine in which a plurality of compression rings are mounted on the piston, one among the plurality of compression rings is formed as a second ring mounted at a second position from the combustion chamber side.

\* \* \* \* \*

UNITED STATES PATENT AND TRADEMARK OFFICE
CERTIFICATE OF CORRECTION

Page 1 of 1

PATENT NO. : 12,292,118 B2
APPLICATION NO. : 18/839495
DATED : May 6, 2025
INVENTOR(S) : Yushi Abe et al.

It is certified that error appears in the above-identified patent and that said Letters Patent is hereby corrected as shown below:

In the Claims

Column 13, Line 5, Claim 1, "the the" should be -- the --.

Signed and Sealed this
Thirtieth Day of September, 2025

John A. Squires
*Director of the United States Patent and Trademark Office*